Oct. 18, 1949.  J. B. ROBINS  2,485,111
ADJUSTABLE SEAT FOR VEHICLES
Filed Nov. 26, 1945  4 Sheets-Sheet 1

INVENTOR.
JACK B. ROBINS
BY
Martin E Anderson
ATTORNEY

Oct. 18, 1949.　　　　　J. B. ROBINS　　　　　2,485,111
ADJUSTABLE SEAT FOR VEHICLES

Filed Nov. 26, 1945　　　　　　　　　　　　4 Sheets-Sheet 2

INVENTOR.
JACK B. ROBINS
BY
Martin E. Anderson
ATTORNEY

Oct. 18, 1949.　　　J. B. ROBINS　　　2,485,111
ADJUSTABLE SEAT FOR VEHICLES

Filed Nov. 26, 1945　　　　　　　　　　　　4 Sheets-Sheet 3

INVENTOR.
JACK B. ROBINS
BY
Martin E Anderson
ATTORNEY

Oct. 18, 1949.  J. B. ROBINS  2,485,111
ADJUSTABLE SEAT FOR VEHICLES
Filed Nov. 26, 1945  4 Sheets-Sheet 4

INVENTOR.
JACK B. ROBINS
BY
Martin E. Anderson
ATTORNEY

Patented Oct. 18, 1949

2,485,111

UNITED STATES PATENT OFFICE 2,485,111

ADJUSTABLE SEAT FOR VEHICLES

Jack B. Robins, Colorado Springs, Colo.

Application November 26, 1945, Serial No. 630,865

6 Claims. (Cl. 155—5)

This invention relates to improvements in vehicle seats and has reference more particularly to a construction designed primarily for use in connection with airplanes.

It is the object of this invention to produce a seat of the hammock type which shall be provided with means for quickly and readily adjusting the height of the seat to the most comfortable position.

Another object of the invention is to produce a seat having a head rest that can be independently adjusted to the most comfortable position.

A further object of the invention is to produce a seat having arm rests that can be moved from operative to inoperative position.

A further object of the invention is to provide a seat with a back rest that can be tightened and loosened by the operator and which will also automatically move to inoperative position, if subjected to an upwardly directed force.

A further object of the invention is to produce a seat of the kind described that shall require the minimum amount of space and which shall be of such construction that most of the parts thereof can be made of tubular material so as to reduce the weight.

A further object is to provide a back rest that can be adjusted as to tension by the mere movement of a lever and while the occupant retains his position in the seat.

A further object is to produce a seat in which certain of the several adjustments can be readily effected by the occupant by the simple expedient of moving a lever and without moving from the seat.

The above and other objects that may appear as the description proceeds are attained by means of a construction and an arrangement of parts that will now be described in detail and for this purpose reference will be had to the accompanying drawings, in which the invention has been illustrated and in which.

Figure 1:
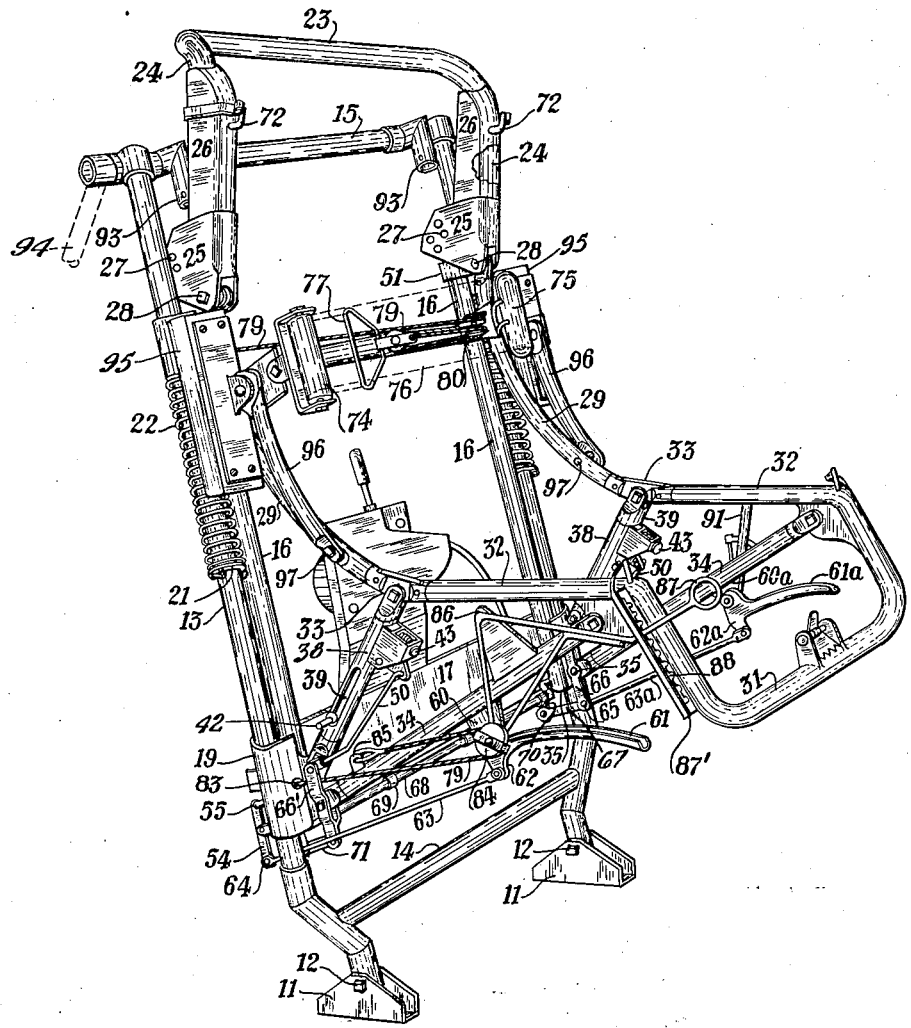
Figure 1 is a perspective view showing the frame work of the seat in such a way as to illustrate the relative position of the parts, the arm rests having been omitted in the interest of clarity.

Referring now to the drawing, reference numeral 10 designates a surface on which the seat is supported and reference numeral 11 designates brackets or hinged members that are secured to the support by suitable means which have not been shown. In the embodiment illustrated the members 11 have a U-shaped cross section and are provided with openings for the reception of pivots 12, whose function will presently appear.

Connected with the brackets 11 by means of the pivots 12, is an upwardly ranging back frame comprising substantially upright tubular members 13, whose lower ends are positioned in and pivotally connected with the brackets. Members 13 are connected to each other near the bottom by transverse bar 14. The upper ends of frame members 13 are connected by a transverse tubular member 15.

A seat frame is slidably connected to the back frame for adjustment therealong, the seat frame including, in general, a slidable frame portion, and certain articulated members secured thereto and movable therewith, to be hereinafter described.

The slidable frame portion of the seat frame comprises two parallel tubular members 16, whose lower ends are connected by means of a flat transverse bar 17 and whose upper ends are connected by a tubular transverse bar 18. The ends of bar 17 are provided with tubular bearings 19 that encircle the frame members 13. Members 16 extend above the transverse bar 18 and are provided with tubular bearings 20 that also encircle the upwardly ranging back frame members.

Figure 4:
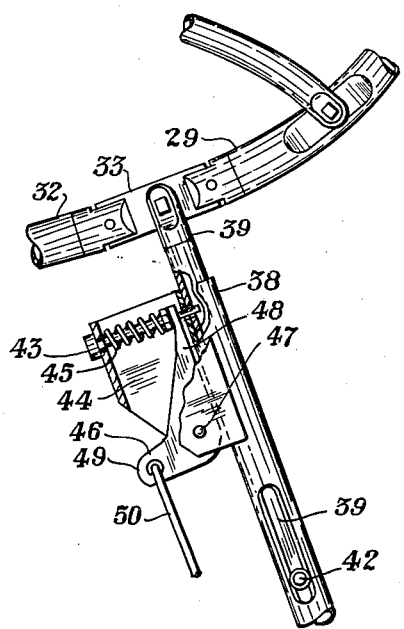
Figure 4 is a fragmentary detail view, partly in section, showing certain features of the construction to an enlarged scale.
Figure 5:
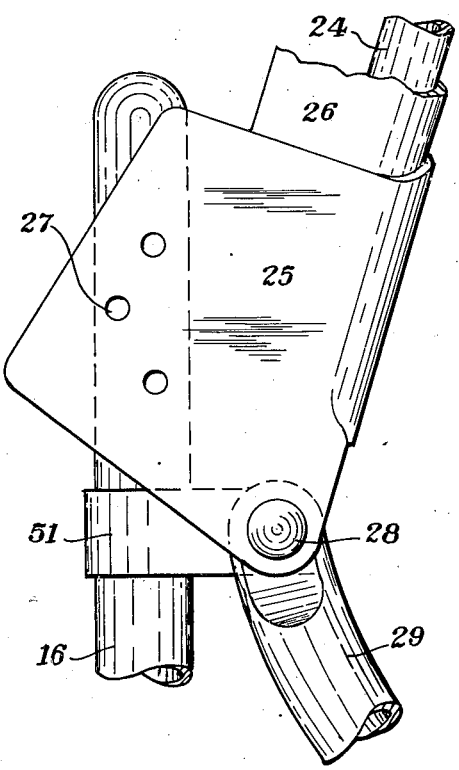
Figure 5 is a fragmentary elevational view to an enlarged scale, showing another detail of the construction.

It will now be seen that the slidable frame comprising members 16, 17 and 18 can slide along the back frame members 13. Surrounding members 13 with their upper ends abutting the lower ends of bearings 20 and their lower ends abutting washers 21 that are held from downward movement by means of pins, are helical compression springs 22, of sufficient strength to raise the seat frame together with the parts attached thereto. Connected with the upper ends of members 16 is a head rest comprising a tubular bar having a transverse portion 23 and downwardly extending arms 24 to which are secured the channel shaped hinge members 25. The downwardly extending arms 24 have been shown as enclosed in a sheet metal covering 26. Hinge members 25 straddle the upper ends of members 16 and are secured to the latter by means of pins passing through one of the openings 27. Each hinge member is provided with several openings so that an adjustment can be effected manually. The lower ends of hinge members 25 are provided with openings for the reception of pivot pins 28 by means of which a pivotal connection is effected between the hinge members, the straps 51 connected with the upper ends of members 16, and with the upper ends of the rearwardly curved tubular members 29, as shown in Fig. 5. Bearings 19 are provided on their front surfaces with forwardly extending plates 30 to which reference will presently be made. The U-shaped member 31, which forms the front end of the seat frame, has portions 32 of its limbs extending rearwardly in a manner shown quite clearly in Figures 1 and 2. The ends of portions 32 are connected with the lower ends of the curved tubular members 29 by means of hinge members 33. Tubular compression members 34 have their lower ends pivotally connected with the plates 30 at 35 and have their upper ends pivotally connected with the gusset plates 36 by means of pivots 37. Since members 32 and 29 are hingedly connected by member 33, it is necessary to provide other frame elements to produce a rigid triangular structure. The additional frame elements comprise strut tubes 38 with which are telescopically connected round bars 39. Tubular members 38 are pivoted at 40 to plates 30 and are provided with longitudinally extending slots 41 through which the safety belt attachment pins 42 pass. The inner ends of pins 42 are connected with bars 39. Secured to the upper ends of tubular members 38 are latching pins 43, positioned in housings 44 that in turn are attached to the tubular members 38 and urged inwardly by means of springs 45. Bell crank levers 46 are positioned within the housings and pivotally connected with them at 47. The upper ends of the inner bell crank arms 48 project under the spring abutment while the outer ends of the outwardly extending bell crank arms 49 are connected to links 50, as shown in Figure 4. To avoid any confusion as to what members are intended in the claims, the members 29 will be referred to therein as a "first pair of elongated members," the members 32 as a "second pair of elongated members," the members 34 as a "third pair of elongated members," and members 38, 39 on each side of the frame as a "fourth pair of elongated telescopic members."

The seat frame may be adjusted due to the construction of its side frames, tubular members 34, members 32, and the adjustable struts 38, 39 shown somewhat enlarged in Figure 4, these struts forming the common side of triangles formed by members 29 and 16, or by members 32 and 34, in which members 32 and 29 are interconnected by hinge members 33. By adjusting the length of the strut comprising members 38 and 39 the angularity of the above defined triangles can be varied.

Links 50, above described, are connected, at each side of the frame, to one end of a rocker arm 66 (see Figure 6), the latter being connected at its other end to a handle 61a by means of a tension member or link 63a.

A rod 52 extends the entire length of bar 17 and is mounted for rotation in bearings 53 on bar 17. Secured to one end of rod 52 is a crank arm 54 that is connected at its upper end to a latching pin 55 that extends through an opening in bearing 19 and into one of holes 58 in one of frame members 13. The other end of rod 52 has a crank arm 56 that carries a latching pin 57 which extends through an opening in the other bearing 19 and engages one of the holes 58 in the other frame member 13, pins 55 and 57 serving to latch bearings 19 to their respective members 13, on which they are slidably adjustable. Torsion springs 59 are connected with rod 52 and bar 17 in such a way that they exert a rotary force in a direction to urge pins 55 and 57 into engagement with the holes 58.

In order to release pins 55, 57, when desired, a lever 61 (see Figure 1) is pivotally mounted on a bracket plate 60 secured to member 34, this lever being in the form of a bell crank having a downwardly extending arm 62 formed as a part thereof. A link 63 is pivotally connected at one end to arm 62 and at its other end to the lower end of crank arm 54 at point 64. It will now be apparent that if lever 61 is moved upwardly, when viewed as in Figure 1, rod 52 will be rotated in such manner as to pull pins 55 and 57 rearwardly out of engagement with holes 58 in the respective members 13. When pins 55 and 57 are thus released springs 22 will urge the portion of the seat frame which slides on members 13 upwardly, and when a desired position is attained the lever 61 may be released thus latching the slidable portion of the seat frame to members 13.

Figure 2:
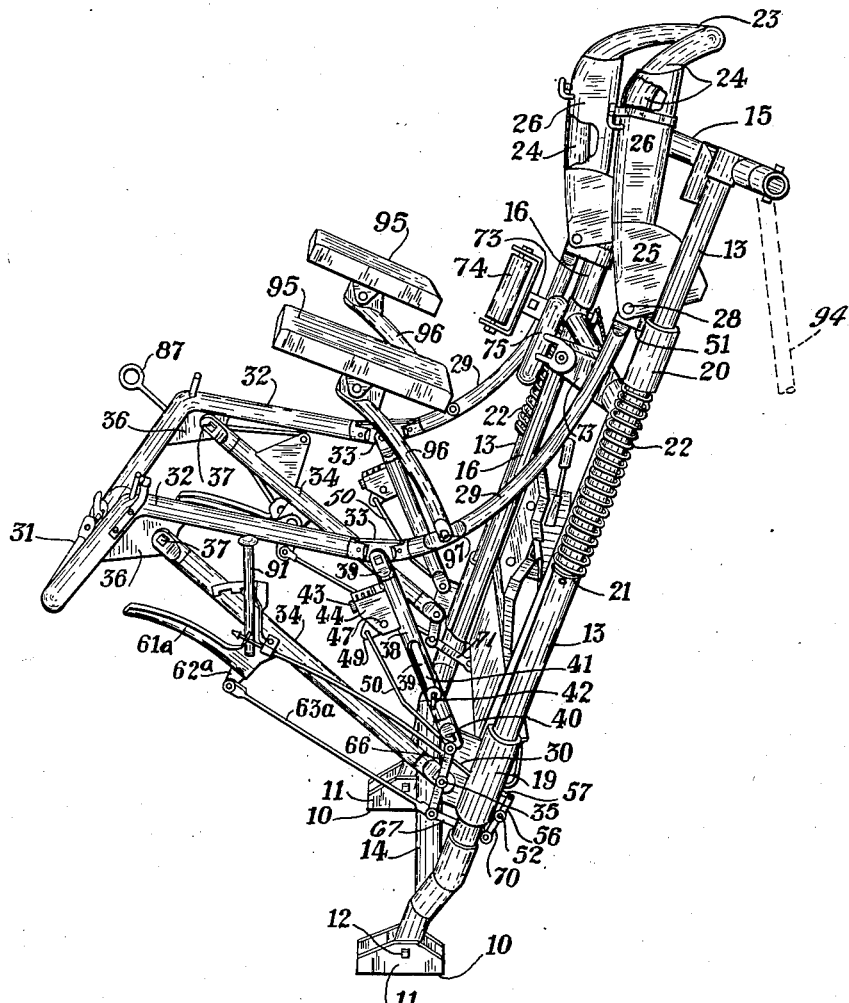
Figure 2 is a perspective view showing the seat from the side opposite from that illustrated in Figure 1.
Figure 3:
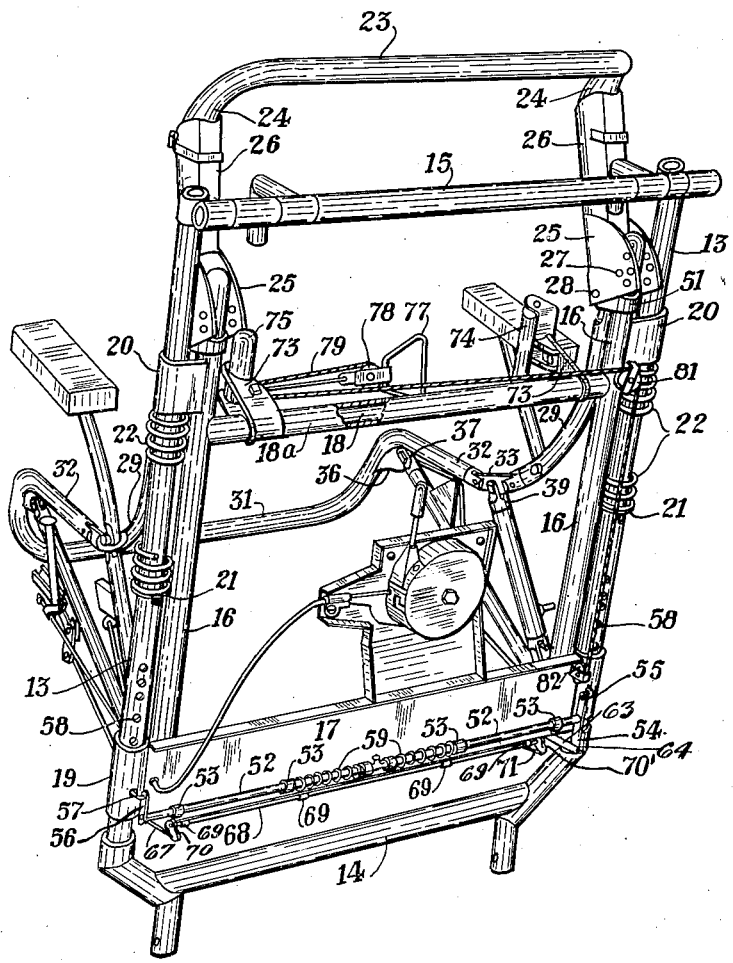
Figure 3 is a perspective view showing the back of the seat.
Figure 6:
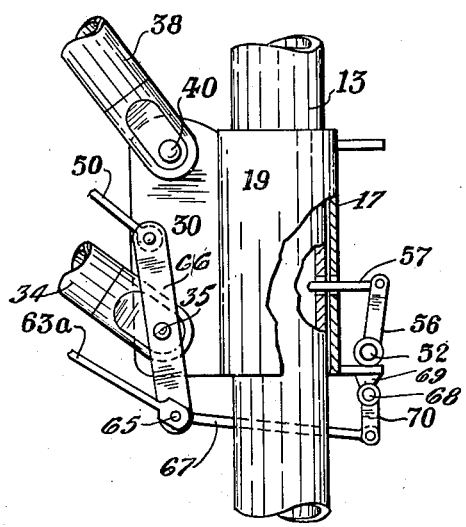
Figure 6 is a fragmentary side elevational view, partly in section, showing another detail to an enlarged scale.

On the far side of the device, as viewed in Figure 1, a similar lever 61a is provided, this lever being pivotally secured to bracket 60a on member 34 and having a downwardly extending arm 62a, similar to arm 62, previously described. The purpose of lever 61a is to control the lengths of strut members 38, 39, on the sides of the seat frame. This control is effected as follows: Referring to Figure 2, a link 63a is pivotally connected at its upper end to arm 62a and at its lower end at 65 to the lower end of a lever 66, the latter being pivoted at 35 to plate 30, as best shown in Figure 6. One of links 50, previously described, is connected at its lower end to the upper end of lever 66. A link 67 is pivoted at its front end (see Figure 6) to lever 66, also at 65, and extends rearwardly, the rear end thereof being pivotally connected to the lower end of crank arm 70 secured to one end of rod 68 which is mounted for rotation in bearings 69 on bar 17, as best shown in Figure 3. At the other end of rod 68 there is a crank arm 70' that is connected by means of a link 71 with the lower end of a lever 66', as best shown in Figure 1. The other link 50 is pivotally connected at its lower end to the upper end of lever 66'. It will now become apparent that when the occupant of the seat moves lever 61a upwardly the links 50 will be moved downwardly, by the linkage described, thus disengaging pins 43. With these pins disengaged the occupant can change the angular relation of the triangles previously described.

Referring now more particularly to the head rest of which the transverse member 23 has been shown, it is apparent that this can be adjusted by changing the position of the pins that pass through holes 27. Several such holes have been provided with corresponding holes in the upper ends of members 16 and therefore a close adjustment can be effected. A strip of canvas, which has not been shown, extends between the two parts 26 and is attached to the latter by means of hooks 72 forming a hammock suspension for the head.

Surrounding transverse bar 18 is a tube 18a that carries forwardly extending arms 73 which are mounted for rotation about transverse member 18. Secured to the front end of one arm 73 is a roller 74 and to the front end of the other arm a cylindrical anchor 75 about which is positioned a canvas fabric band that has been shown by dotted lines in Figure 1 and designated by reference numeral 76. One end of this band is secured to anchor 75 and the other to a triangular wire loop 77 to which is attached a pulley 78 that is positioned in the bight of a cable 79 that passes around pulley 80 and from thence across the back of the chair to pulley 81 and thence downwardly and about pulley 82, shown most clearly in Figure 3, emerging between frame members 13 and 16, through an opening 83, see Fig. 1. This cable then passes around pulley 84 and has its end anchored to bar 34 at 85, see Fig. 1. Pulley 84 is connected with one arm of a bell crank lever that is pivoted at 86 to a bracket carried by bar 34. The end of the upper bell crank arm terminates in a handle 87 that moves in a slot in a guide member 87'. One side of the slot has a plurality of notches 88 that are adapted to receive and hold the bell crank lever in adjusted position. By moving handle 87 upwardly from the position shown in Figure 1, the canvas band 76 will be tightened. Due to the arrangement of pulleys, the force exerted by the occupant on lever 87 is multiplied several times and it is therefore possible to place the canvas back band 76 under considerable tension. This multiplication will readily become apparent from a consideration of Figure 1 wherein a first multiplication is obtained between pulley 84, fixed end 85 and cable 79, and further multiplication is obtained at the upper end of cable 79 where it passes around pulley 78 and returns to be fixed at one end to the bracket supporting pulley 78, as shown in Figure 3. The parts are so arranged that the two parts 74 and 75 together with the canvas back band can rotate about frame member 18 upwardly or in a clockwise direction when viewed as in Figure 2, because tube 18a to which arms 73 are attached may turn about tube 18 as above pointed out. This is of great importance where the seat is used in connection with airplanes, for example, for pilot seats, where the pilot carries a parachute strapped to his back. In case the parachute should strike the under or lower edge of band 76 the whole assembly will turn upwardly and into a position in which it will not interfere with the movement of the pilot.

Stops 93 are provided to limit the rearward movement of the head rest.

Suitable means, such as braces 94, are provided for rigidly connecting the back frame to the floor or support. Any other suitable equivalent means can be provided for this purpose.

A tubular member 96 is connected to each member 29 by a pivot pin 97. The upper end of such tubular member carries an arm rest 95. These arm rests are shown in their lowered positions in Figures 2 and 3 and in their raised or folded back positions in Figure 1.

Having described the invention what is claimed as new is:

1. A seat for use by a pilot in an aircraft, comprising, a back frame having two spaced parallel upwardly ranging frame members, a seat frame having upwardly extending portions mounted on said frame members, a pivot shaft carried by the seat frame near the upper end thereof, a back rest comprising a tubular bearing member mounted for rotation about said pivot shaft, an arm projecting from each end of the bearing member, the outer end of each arm having a transversely extending cylindrical member, and a flexible band encircling the cylindrical members, forming a back rest, the back rest assembly being rotatable, about the pivot shaft, in an upward direction, to a position in which the arms extend upwardly.

2. A seat for use by a pilot in an aircraft, comprising a back frame having two spaced parallel upwardly ranging members, a substantially rectangular seat frame having an upwardly ranging portion mounted on the spaced frame members, the upper transverse member of the seat frame having mounted thereon, for limited rotary movement, a tubular bearing member, arms projecting laterally from the ends of said bearing member, a roller connected with the outer end of one arm, an elongated anchor connected with the outer end of the other arm, a canvas band having one end connected with the anchor and the other end passing about the roller, a seat structure projecting from the seat frame, and means for tensioning the band comprising a lever connected with the seat structure and with the free end of the band, the band forming a back rest rotatable in an upward direction about the axis of the bearing member.

3. A seat in accordance with claim 1 wherein one of said cylindrical members is a roller about which an intermediate portion of the band encircles, the band having a free end connected to a tensioning device including a lever mounted on the seat operatively connected by a cable to said free end.

4. An adjustable seat for use by a pilot in an aircraft, comprising an upwardly ranging back frame at the rear end of the seat, a seat frame including a slidable frame portion mounted for slidable adjustment along the back frame, the seat frame having a first pair of elongated members the upper ends of which are pivotally connected to opposite sides of the slidable frame portion adjacent its top and extend downwardly and forwardly, a second pair of elongated members forming forward extensions of the first pair of elongated members, the second pair of elongated members being joined together at their front ends, means pivotally connecting the forward ends of each of the first pair of elongated members with the rearward ends of the second pair of elongated members for articulation about a horizontal axis, a third pair of elongated members each pivotally connected to the lower end of the slidable frame portion, at opposite sides thereof, and extending upwardly and forwardly, the forward ends thereof being pivotally connected to the second pair of elongated members forwardly of the pivoted connection between the latter and the first pair of elongated members, and a fourth pair of elongated telescopic members each pivotally connected at its lower end to the lower end of the slidable frame portion, at opposite sides thereof, and means for fixedly securing the fourth pair of telescopic members together at various lengths of adjustment, the upper ends of the fourth pair of elongated telescopic members being pivotally connected to portions of the seat frame.

5. A seat in accordance with claim 4 wherein the means for securing each of the fourth pair of elongated telescopic members together includes a latch pin operatively associated therewith, the latch pins being interconnected to a lever which is disposed in a position accessible to the pilot.

6. A seat in accordance with claim 4 wherein the upwardly ranging back frame comprises spaced parallel tubes having compression springs disposed thereabout, one end of each spring being secured to a tube and the other end engaging the slideable frame portion to urge the seat frame upwardly, latch pins for securing the slidable frame portion to the parallel tubes at various positions therealong, the latch pins being interconnected to a lever which is disposed in a position accessible to the pilot.

JACK B. ROBINS.

REFERENCES CITED

The following references are of record in the file of this patent:

UNITED STATES PATENTS

| Number | Name | Date |
|---|---|---|
| 1,882,315 | Clayton | Oct. 11, 1932 |
| 2,292,414 | Vernon | Aug. 11, 1942 |
| 2,383,173 | Watter | Aug. 21, 1945 |